United States Patent
Stack et al.

(10) Patent No.: US 7,336,162 B2
(45) Date of Patent: Feb. 26, 2008

(54) DOUBLE MOLD SHOT PULL TO SEAT UNIVERSAL TPMS SENSOR

(75) Inventors: John Stack, Shelby Township, MI (US); Christopher J. Darr, Livonia, MI (US); Frank Buccinna, Livonia, MI (US)

(73) Assignee: Lear Corporation, Southfield, MI (US)

(*) Notice: Subject to any disclaimer, the term of this patent is extended or adjusted under 35 U.S.C. 154(b) by 218 days.

(21) Appl. No.: 11/306,284

(22) Filed: Dec. 21, 2005

(65) Prior Publication Data

US 2007/0139178 A1    Jun. 21, 2007

(51) Int. Cl.
  *B60C 23/02* (2006.01)
  *B60C 23/00* (2006.01)
  *F16K 15/20* (2006.01)

(52) U.S. Cl. ............... 340/442; 73/146.8; 137/226; 116/34 B; 152/152.1

(58) Field of Classification Search ........... 340/442; 73/146.8; 137/224, 226, 232–234, 230; 254/93 VA; 116/34 B; 152/152.1
See application file for complete search history.

(56) References Cited

U.S. PATENT DOCUMENTS

| | | | | |
|---|---|---|---|---|
| 5,365,967 A | * | 11/1994 | Moore | 137/226 |
| 5,770,797 A | * | 6/1998 | Lapohn | 73/146.8 |
| 6,302,138 B1 | * | 10/2001 | Sumrall | 137/226 |
| 6,427,714 B2 | * | 8/2002 | Freigang et al. | 137/225 |
| 6,904,795 B1 | | 6/2005 | Uleski | 73/146 |
| 7,021,326 B2 | * | 4/2006 | Rogier | 137/226 |
| 7,237,439 B1 | * | 7/2007 | Rutherford et al. | 73/732 |
| 2005/0028865 A1 | | 2/2005 | Nlkolayev | 137/223 |
| 2005/0192727 A1 | | 9/2005 | Shostak | 701/37 |

* cited by examiner

*Primary Examiner*—Benjamin C. Lee
*Assistant Examiner*—Jennifer Mehmood
(74) *Attorney, Agent, or Firm*—Earl LaFontaine

(57) ABSTRACT

A tire pressure sensor assembly is provided for use with a wheel rim including a valve hole. The sensor assembly including a metal valve stem element having a stem base, a stem body, a stem cap end, and an inner stem chamber. A lower sensor housing is rigidly over-molded onto the stem base and forms a sensor storage chamber. A tire pressure sensor element is mounted therein. An outer rubber seal is over-molded onto the stem body and includes an inner retention portion, an outer retention portion, and a retention groove configured to allow the metal valve stem element to be press-fit and retained into the valve hole. A plurality of vent holes are formed spaced around an outer perimeter of the stem base to allow universal orientation within the valve hole.

20 Claims, 2 Drawing Sheets

DOUBLE MOLD SHOT PULL TO SEAT UNIVERSAL TPMS SENSOR

TECHNICAL FIELD

The present invention relates generally to a tire pressure monitor system and more particularly to a tire pressure monitor sensor with improved manufacturing and installation characteristics.

BACKGROUND OF THE INVENTION

Tire pressure sensor monitor systems are commonly comprised of complex manufactured sensor systems bolted to the wheel rim to transmit tire pressure from within the wheel to a remote receiver. Existing systems commonly mount the TPMS components directly onto the valve stem. The difficulty with existing systems is that the valve stem hole is commonly positioned in a location with tight space requirements. This has lead to the development of highly asymmetric vertical configurations requiring precise orientation to guarantee proper performance.

In addition, the tight space configurations place considerable assembly difficulties onto securing the double nut assemblies commonly utilized to secure the TPMS to the valve hole in the wheel rim. For these designs, installation requires holding the TPMS in the correct orientation; managing to insert tooling to tighten the double bolt assemblies; and properly securing while only having a single side visible. These assembly difficulties can cost considerable time and money. Furthermore, reducing installation difficulty and restraints on orientation can allow for an increase in reliable performance.

As such, it would be highly desirable to have a tire pressure monitoring system with improved manufacturing and assembly characteristics. It would further be highly desirable to have such a tire pressure monitoring system that reduced restraints on orientation during installation.

SUMMARY OF THE INVENTION

In accordance with the objects of the present invention a tire pressure sensor assembly is provided for use with a wheel rim including a valve hole. The sensor assembly including a metal valve stem element having a stem base, a stem body, a stem cap end, and an inner stem chamber. A lower sensor housing is rigidly over-molded onto the stem base and forms a sensor storage chamber. A tire pressure sensor element is mounted therein. An outer rubber seal is over-molded onto the stem body and includes an inner retention portion, an outer retention portion, and a retention groove configured to allow the metal valve stem element to be press-fit and retained into the valve hole. A plurality of vent holes are formed spaced around an outer perimeter of the stem base to allow universal orientation within the valve hole.

Other objects and features of the present invention will become apparent when viewed in light of the detailed description and preferred embodiment when taken in conjunction with the attached drawings and claims.

DESCRIPTION OF PREFERRED EMBODIMENTS

Figure 1:
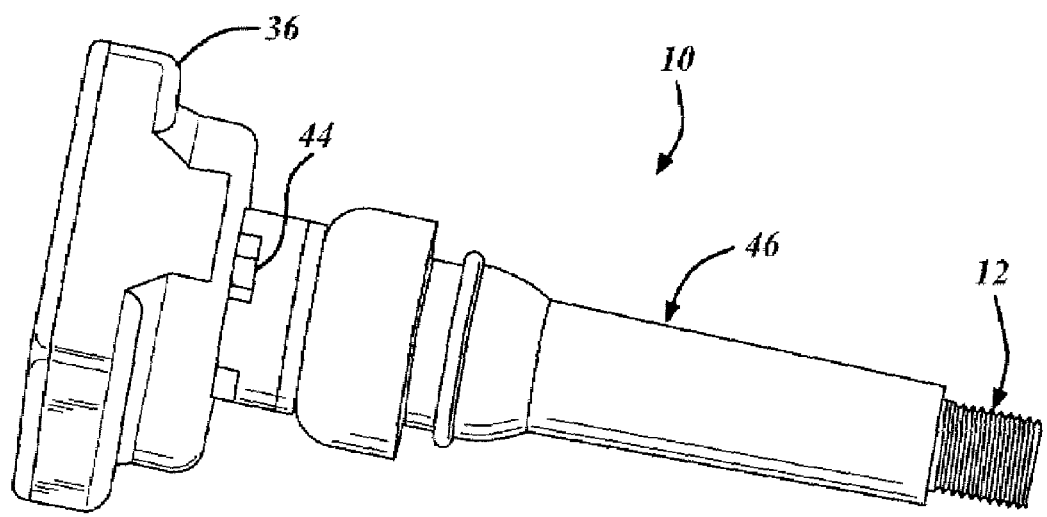
FIG. 1 is an illustration of a tire pressure sensor assembly in accordance with the present invention.
Figure 2:
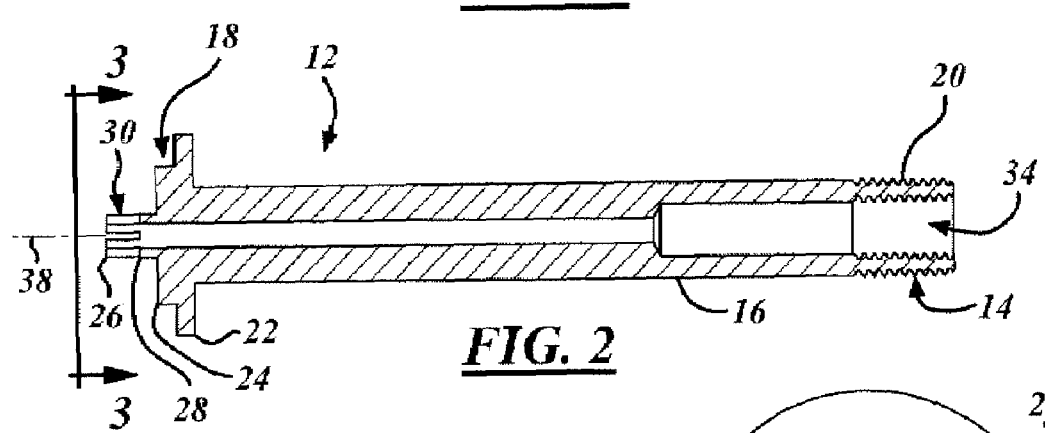
FIG. 2 is a cross-sectional illustration of a stem element for use in the tire pressure sensor assembly illustrated in FIG. 1.
Figure 3:
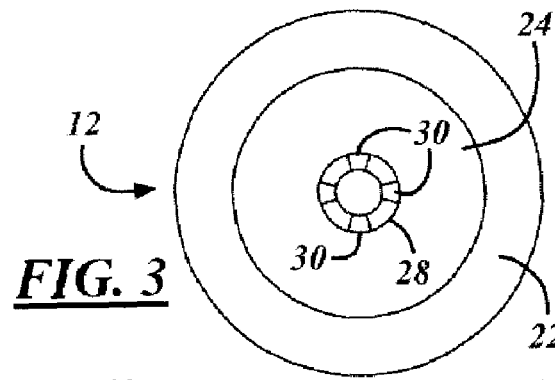
FIG. 3 is a bottom view of the stem illustrated in FIG. 2.

Referring now to FIG. 1, which is an illustration of a tire pressure sensor assembly 10 in accordance with the present invention. The tire pressure sensor assembly 10 illustrated is intended for use in an automobile, however additional uses will become evident in light of the present disclosure. The tire pressure sensor assembly 10 is comprised of a metal valve stem element 12 preferably constructed from aluminum. The metal valve stem element 12 (see FIGS. 2 and 3) is comprised of a stem cap end 14, a stem body 16 and a stem base 18. The stem cap end 14 includes a plurality of threads 20. The stem base 18 includes a first base outer rim 22, a second smaller base inner rim 24 and an even smaller vent protrusion 26.

Figure 4:
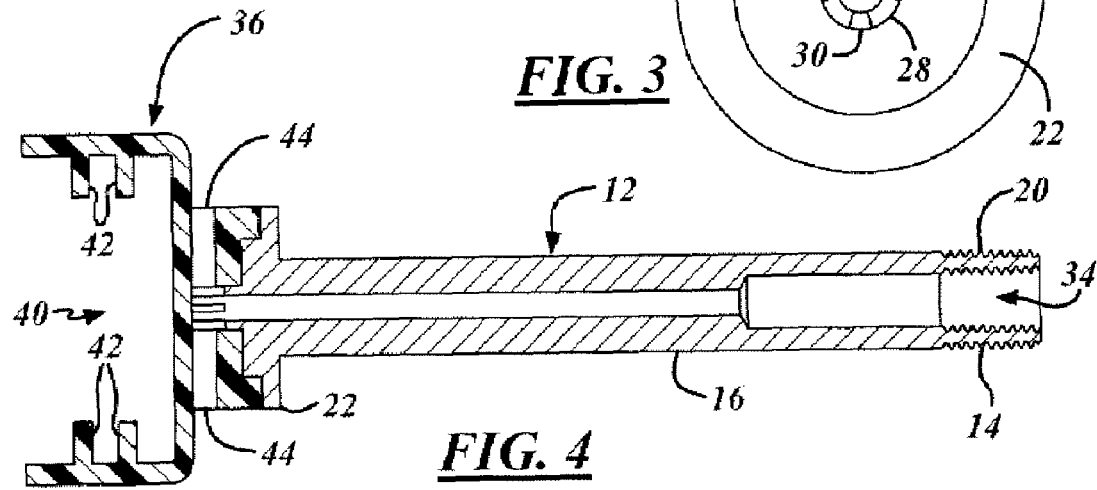
FIG. 4 is a detail cross-section of the tire pressure sensor assembly illustrated in FIG. 1, the illustration showing stem after a first overmolding.
Figure 5:
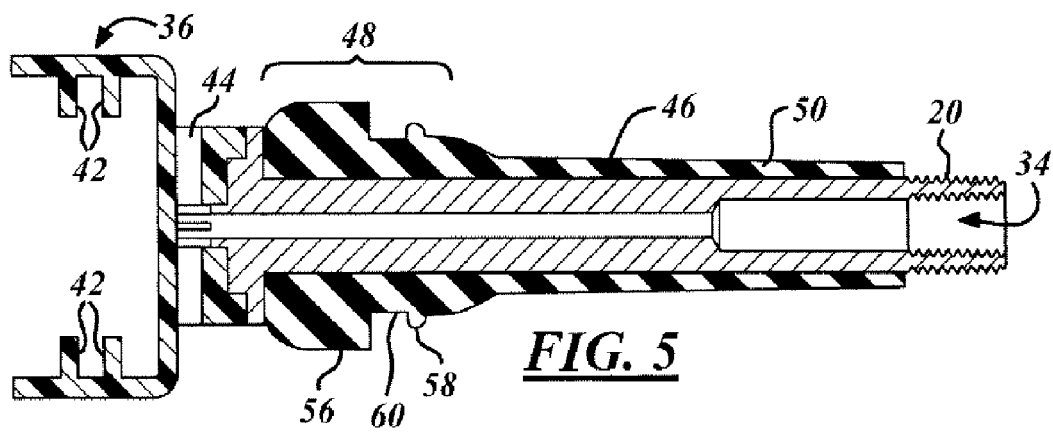
FIG. 5 is a detail cross-section of the tire pressure sensor assembly illustrated in FIG. 1, the illustration showing stem after a second overmolding.
Figure 6:
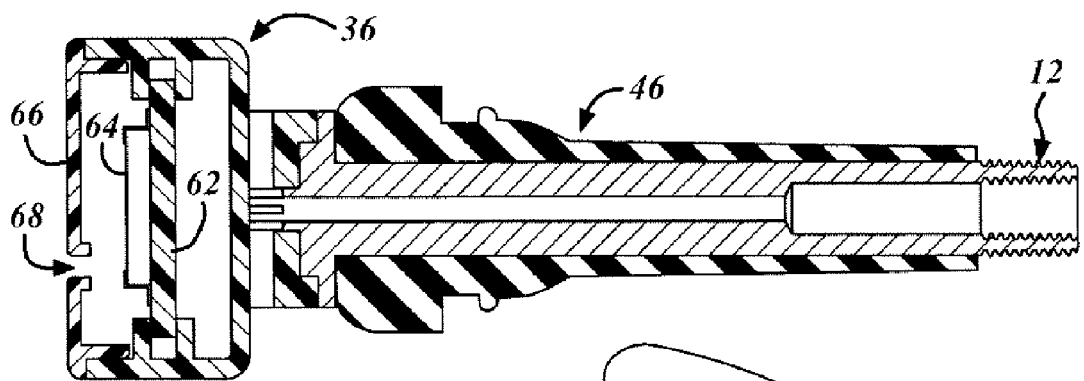
FIG. 6 is a detail cross-section of the tire pressure sensor assembly illustrated in FIG. 1, the illustration showing installation of a sensor housing cover.

The vent protrusion 26 portion of the stem base 18 forms an outer perimeter 28 in which a plurality of vent holes 30 are spaced equally around. The vent holes 30 provide ventilation communication with the inner stem chamber 34. Onto the metal valve stem element 18 is rigidly over-molded a lower sensor housing 36 (FIG. 4). The lower sensor housing 36 is preferably formed perpendicular to the stem axis 38. The lower sensor housing 36 forms a sensor storage chamber 40 preferably with a plurality of sensor engagement slots 42. Although the lower sensor housing 36 rigidly engages the stem base 18, it fails to cover the plurality of vent holes 30. In one embodiment, the lower sensor housing 36 forms a plurality of overmold housing vents 44 axially coincident with the plurality of vent holes 30. The lower sensor housing 36 is preferably symmetrically orientated relative to the stem axis 38.

Figure 7:
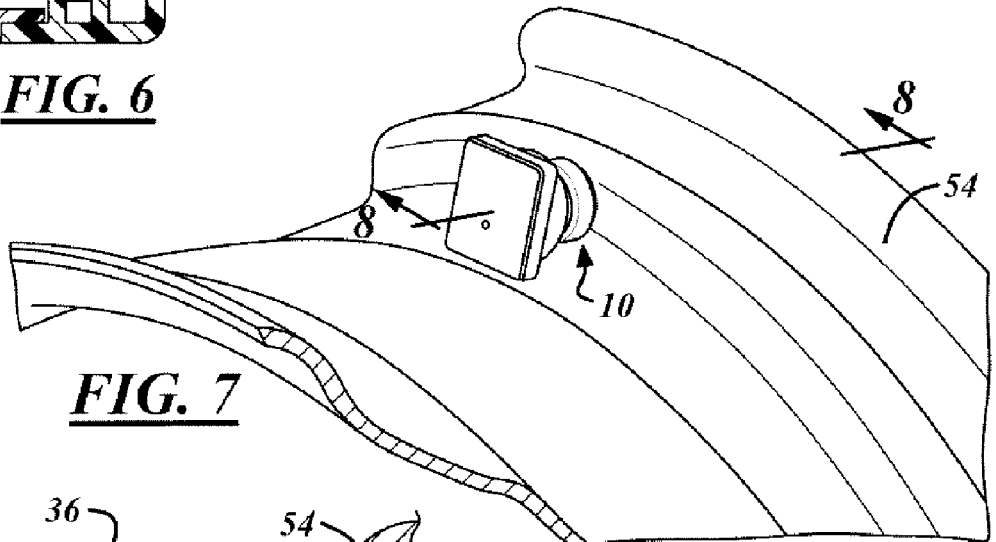
FIG. 7 is an illustration of the tire pressure sensor assembly illustrated in FIG. 1, the tire pressure sensor assembly illustrated installed in a wheel rim.
Figure 8:
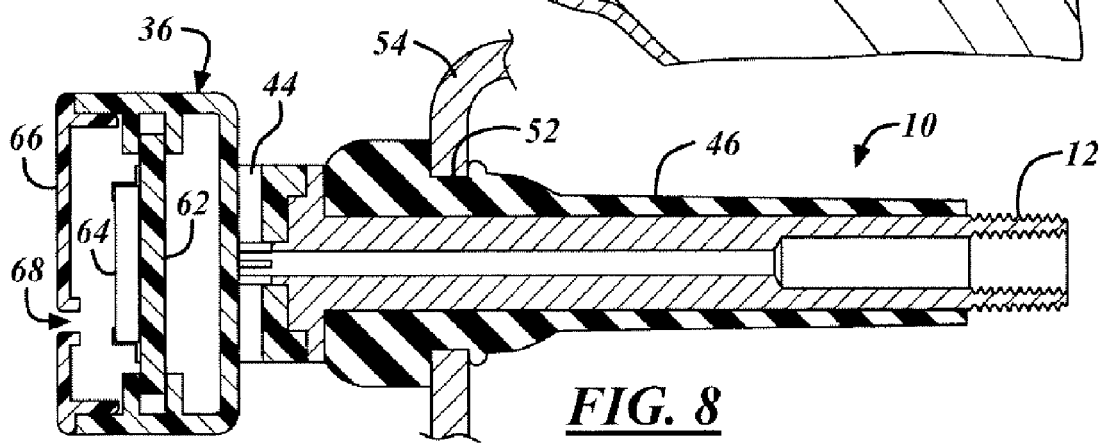
FIG. 8 is a cross-sectional illustration of the assembly illustrated in FIG. 7.

After the first over-mold shot generating the rigid lower sensor housing 36, a second shot of over-mold is applied to form an outer rubber seal 46 about the stem body 16 running from the stem base 18 up until the stem cap end 14. The outer rubber seal includes a press-fitting 48 formed in the seal outer surface 50 configured to engage a valve hole 52 formed in a wheel rim 54 (see FIGS. 7 and 8). Although a variety of press fittings 48 are contemplated, one embodiment contemplates an inner retention portion 56 and an outer retention portion 58 configured in relation to generate a retention groove 60. The outer retention portion 58 is designed to be pushed through the valve hole 52 and retain the pressure sensor assembly 10 therein. The stem body 16 is designed to protrude past the retention groove 60 such that when inserted into the valve hole 52 the pressure sensor assembly 10 is relatively rigidly mounted therein. Once inserted into the valve hole 52, the plurality of vent holes 30 spaced around the outer perimeter 28 allows the sensor assembly 10 to a have infinite (or universal) orientation therein. The symmetrical and horizontal formation of the lower sensor housing 36 allows for a reduced profile that also allows such universal orientation.

Inside the sensor storage chamber 40 is mounted a tire pressure sensor element 62. The tire pressure sensor element 62 includes a sensor battery 64 attached thereto. The tire pressure sensor element 62 is intended to encompass a wide variety of transceivers capable of generating a wireless signal indicative of sensed air pressure. The tire pressure sensor element 62 is preferably retained within the sensor engagement slots 42 in a horizontal orientation for a reduced profile. A sensor cover housing 66 covers the sensor storage chamber 40 and may be attached by way of potting material, sonic welding, or even an additional shot of overmold. A pressure inlet 68 is formed in the sensor cover housing 66 to allow air pressure from inside the wheel rim 54 access to the tire pressure sensor element 62.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A tire pressure sensor assembly for use with a wheel rim including a valve hole, the tire pressure sensor assembly comprising:
    a metal valve stem element comprising a stem base, a stem body, a stem cap end, and an inner stem chamber;
    a lower sensor housing over-molded onto said stem base, said lower sensor housing forming a sensor storage chamber;
    a tire pressure sensor element mounted within said sensor storage chamber;
    an outer rubber seal over-molded onto said stem body, said outer rubber seal including an inner retention portion, an outer retention portion, and a retention groove, said outer retention portion configured to allow said metal valve stem element to be press-fit into the valve hole and retained by said retention groove;
    a plurality of vent holes in communication with said inner valve chamber, said plurality of vent holes configured to allow universal orientation of said metal valve stem element within the valve hole.

2. A tire pressure sensor assembly as described in claim 1, wherein said plurality of vent holes are formed into said metal valve stem.

3. A tire pressure sensor assembly as described in claim 1, wherein said plurality of vent holes are formed spaced around an outer perimeter of said stem base to facilitate universal orientation.

4. A tire pressure sensor assembly as described in claim 1, wherein said lower sensor housing is perpendicular to a stem axis such that said tire pressure sensor element is horizontally mounted.

5. A tire pressure sensor assembly as described in claim 1, wherein said lower sensor housing is symmetrically mounted relative to a stem axis.

6. A tire pressure sensor assembly as described in claim 1, wherein said retention groove is positioned along said stem body such that said stem body protrudes past the valve hole after installation to increase mounting rigidity.

7. A tire pressure sensor assembly as described in claim 1, further comprising:
    a sensor housing cover covering said sensor storage chamber.

8. A tire pressure sensor assembly as described in claim 7, further comprising:
    a pressure inlet formed in said sensor housing cover.

9. A tire pressure sensor assembly as described in claim 1, further comprising:
    a plurality of over-mold housing vents axially coincident with said plurality of vent holes.

10. A tire pressure sensor assembly for use with a wheel rim including a valve hole, the tire pressure sensor assembly comprising:
    a metal valve stem element comprising a stem base, a stem body, a stem cap end, and an inner stem chamber;
    a lower sensor housing rigidly over-molded onto said stem base, said lower sensor housing forming a sensor storage chamber;
    a tire pressure sensor element mounted within said sensor storage chamber;
    an outer rubber seal over-molded onto said stem body, said outer rubber seal including an inner retention portion, an outer retention portion, and a retention groove, said outer retention portion configured to allow said metal valve stem element to be press-fit into the valve hole and retained by said retention groove;
    a plurality of vent holes in communication with said inner valve chamber, said plurality of vent holes formed spaced around an outer perimeter of said stem base to allow universal orientation of said metal valve stem elements within the valve hole.

11. A tire pressures sensor assembly as described in claim 10, wherein said lower sensor housing is perpendicular to a stem axis such that said tire pressure element is horizontally mounted.

12. A tire pressure sensor assembly as described in claim 10, wherein said lower sensor housing is symmetrically orientated relative to a stem axis.

13. A tire pressure sensor assembly as described in claim 10, wherein said retention groove is positioned along said stem body such that said stem body protrudes past the valve hole after installation to increase mounting rigidity.

14. A tire pressure sensor assembly as described in claim 10, further comprising:
    a sensor housing cover covering said sensor storage chamber; and
    a pressure inlet formed in said sensor housing cover.

15. A method of manufacturing a tire pressure sensor assembly for installation in a wheel rim including a valve hole, the method comprising:
    forming a metal valve stem element comprising a stem base, a stem body, a stem cap, and an inner stem chamber, said metal valve stem element including a plurality of vent holes formed spaced around an outer perimeter of said stem base to allow universal orientation of said metal valve stem element within the valve hole after installation;
    overmolding a lower sensor housing onto said metal valve stem element, said lower sensor housing forming a sensor storage chamber;
    overmolding an outer rubber seal onto said stem body, said outer rubber seal including an inner retention portion, an outer retention portion, and a retention groove, said outer retention portion configured to allow said metal valve stem element to be press-fit into the valve hole and retained by said retention groove;

mounting a tire pressure sensor element within said sensor storage chamber.

16. A method as described in claim 15, further comprising:

positioning said retention groove along said stem body such that said stem body protrudes past the valve hole after installation to increase mounting rigidity.

17. A method as described in claim 15, wherein said lower sensor housing is perpendicular to a stem axis such that said tire pressure sensor element is horizontally mounted.

18. A method as described in claim 15, further comprising:

overmolding a lower sensor housing such that a plurality of over-mold housing vents are formed axially coincident with said plurality of vent holes.

19. A method as described in claim 15, wherein said lower sensor housing is orientated symmetrically around a stem axis.

20. A method as described in claim 15, further comprising:

sealing said sensor storage chamber by way of mounting a sensor housing cover over said sensor storage chamber, said sensor housing cover including a pressure inlet formed therein.

* * * * *